3,719,510
                    Patented Mar. 6, 1973

3,719,510
PREPARATION OF EXPANDED SILICATE-BASED AGGREGATES
Ralph E. Temple, Chardon, and William T. Gooding, Jr., Mentor, Ohio, assignors to Diamond Shamrock Corporation, Cleveland, Ohio
No Drawing. Filed Sept. 29, 1971, Ser. No. 184,943
Int. Cl. C04b 31/02
U.S. Cl. 106—40                                          1 Claim

ABSTRACT OF THE DISCLOSURE

A process is provided for the preparation of an expanded insoluble aggregate from a mixture of aqueous and anhydrous alkali metal silicates, having weight ratios of 1:3.0–7.0, with primary and secondary insolubilizers. The anhydrous silicate is added to obtain a silicate solids content within the range of 80–40 percent. After mixing and curing, the composition is ground to a particulate form and subsequently expanded at temperatures in excess of 800° F. The primary insolubilizer, e.g., sodium silicofluoride, serves to reduce the hygroscopicity of the ground particulate material prior to expansion, while the secondary insolubilizer, e.g., calcium carbonate, reacts at expansion temperatures to provide an insoluble lightweight aggregate.

BACKGROUND OF THE INVENTION

It is known to produce porous cellular bodies by the rapid thermal expansion of materials, including silicates, which contain a liquid acting as a blowing agent. Such expanded bodies exhibit excellent thermal and acoustical insulating properties and have been used as, or in a variety of, materials of construction, e.g., concrete fillers, loose insulation, wallboard manufacture, protective coatings and the like. Many of these expanded bodies have been based on alkali metal silicates, owing to their relatively low cost and the excellent physical properties obtainable therewith. Wallboard has been prepared, for example, by the formation of a plastic silicate-containing mass between paper liners followed by thermal expansion. Also, granules of silicate have been expanded at high temperatures to form popcorn-like materials which are useful as is for many insulation-related applications.

A difficulty early noted with the silicate-based materials was their deterioration after exposure to moisture for extended periods of time. With the in situ expanded wallboard it is not possible to subject the core of the board to sufficiently high temperatures to complete the expansion. Hence the low moisture resistance, as well as less than optimum insulating properties. With the granular material, while high temperatures insure complete expansion, the problem of solubility remains. Many attempts have been made to insolubilize these silicate-based materials, most following the theme of subsequent application of an insolubilizing agent, either by coating the expanded body or causing a chemical reaction resulting in the formation of insoluble silica. Obviously, such treatment involves additional steps in the process for obtaining the expanded body, while results are still not entirely satisfactory.

A further problem with the production of silicate-based expanded materials is that, if a workable mass is to be provided, that is, one that will remain in a pattern or which may be ground, it is necessary to increase the viscosity of the aqueous silicate. Commonly, this is done by the addition of various precipitants. However, these materials usually have the undesirable effect of reducing the ability of the silicate to subsequently expand, thereby resulting in a high density product with poor insulating properties.

STATEMENT OF THE INVENTION

Therefore, it is an object of the present invention to provide a route to an expanded insoluble aggregate based on alkali metal siilcates, said aggregate having excellent insulating properties.

It is a further object of the present invention to provide a process for the preparation of an expanded insoluble aggregate based on alkali metal silicates wherein the viscosity of the silicate-containing composition is increased without detriment to the silicate's ability to undergo thermal expansion.

A further object of the invention is to provide a process for the production of a silicate-based aggregate wherein the granulated silicate, prior to expansion, may be retained in particulate form for extended periods of time without caking.

These and further objects of the present invention will become apparent to those skilled in the art from the specification and claims which follow.

There has now been found a process for preparing an expanded insoluble aggregate based on alkali metal silicate, which process comprises:

(A) Mixing, at a temperature less than boiling, an aqueous alkali metal silicate having an alkali metal oxide:silicon dioxide weight ratio of from about 1:3.0–7.0 with an essentially anhydrous alkali metal silicate within the same weight ratio range, the amount of anhydrous added being that quantity sufficient to give, in combination with the aqueous, a total alkali metal silicate solids content of from 80–40 percent by weight and the amount of alkali metal silicate solids being 40–90 percent by weight, dry basis, of the total resultant aggregate;

(B) Admixing, prior to the time when the anhydrous alkali metal silicate becomes substantially hydrated, two insolublizing compounds as follow;

(1) a primary insolubilizer capable of reacting with the alkali portion of the alkali metal silicate at temperatures less than boiling, the amount used being that sufficient to reduce hygroscopicity of the silicate to the point where caking of the composition prior to expansion but subsequent to grinding is prevented and (2) a secondary insolubilizer capable of reacting with the silicate portion of the alkali metal silicate at temperatures used in expanding same, the amount used being that sufficient to render the expanded aggregate water-insoluble, the total amount of insolubilizers used being less than the stoichiometric amount required for total reaction with the alkali metal silicate present;

(C) Continuing mixing until the components will not separate on standing at temperatures up to boiling;

(D) Curing the mixed composition at temperatures up to boiling until the anhydrous alkali metal silicate has become substantially hydrated and the primary insolubilizer reacted;

(E) Cooling the composition to a grindable solid;

(F) Grinding the composition into discrete nonadherent particles suitable for expansion and (G) Rapidly expanding the particles and causing the secondary insolubilizer to react by exposure to temperatures of from about 800°–1800° F.

The use of anhydrous silicate to increase the total silicate solids content of the mixture to within the stated range has the advantage of converting the silicate to a grindable form, without decreasing its ability to undergo subsequent expansion, while maintaining the amount of water present, which water must ultimately be removed, at a minimum. The use of two insolubilizers means that only the minimum amount of reaction necessary to prevent caking of the granulated material prior to expansion will occur, thus leaving more silicate available for expansion, while still providing for a reaction at elevated temperatures in order to achieve water insolubility.

The resultant aggregate is quite lightweight, i.e., 1.5–25 pounds per cubic foot and, owing to the absence of organic materials, is completely fireproof. Likewise, depending mostly upon the nature of the insolubilizer used, the melting point of the aggregate is quite high, i.e., within the range of 1000°–2200° F. The aggregate, primarily non-load bearing in nature, is completely insoluble in boiling water and exhibits thermal conductivities on the order of 0.3 B.t.u. per hour per square inch of surface area per inch thickness per ° F. at a mean temperature of 75° F.

DESCRIPTION OF THE PREFERRED EMBODIMENTS

The term "aggregate" is used to describe the expanded material as a matter of convenience and for the reason that many of uses to which the material will be put correspond with the common uses of aggregate materials. The aggregate is in fact a porous, essentially spherical, particulate material of varying size depending upon such factors as the particle size of the ground material prior to expansion, the degree of expansion which the silicate material undergoes and the like. The aggregate may of course be provided in a shaped form. However, this is generally impractical once any significant cross-section is involved owing to the fact that the outer layer, which expands first, will serve to insulate the interior from heat, therefore preventing complete expansion and insolubilization.

The alkali metal silicates useful are sodium and potassium silicates having the stated weight ratios, preferably, and often hereinafter, sodium silicates having weight ratios within the range of 1:3.2–3.3, these being the materials most readily available commercially. The alkalinity of silicates having weight ratios of less than 1:3.0 is too high to warrant partical use, such alkalinity prohibitively increasing the amount of insolubilizer requried to give a product having the desired properties. Silicates with weight ratios in excess of 1:7.0 are likewise not generally useful since the amounts of silicate solids which may be incorporated with these highly siliceous materials is too low.

The ranges of weight ratios of from 1:3.0–7.0 and of total silicate solids of from 80–40 percent are respective, that is, 80 percent is the maximum total alkali metal silicate solids possible with a 1:3.0 ratio material, whereas 40 percent solids is the minimum posible with a 1:7.0 ratio. Those skilled in the art will understand that the amount of solids required to achieve a like viscosity is less with a more siliceous silicate. Thus, the present invention contemplates that sodium silicates having 1:3.3–3.4 weight ratios will be used within the range of 50–80 percent total solids whereas a sodium silicate having a ratio of 1:7.0 is useful within the range of 40–55 percent. This relationship being established, the amounts of solids useful with the intermediate ranges will either be apparent to, or may readily be established by, those skilled in the art.

Generally, as a matter of convenience, the liquid and anhydrous alkali metal silicates will have the same weight ratios, although such is not required, any ratio within the stated range being satisfactory for either. Likewise, the relative amounts of liquid and anhydrous silicates are not critical, except that a combined silicate solids content of from 80–40 percent is required. For example, since a typical aqueous sodium silicate having a 1:3.22 ratio has a solids content of 39.3 percent, it is apparent that with 100 grams of such a solution there must be combined 57 grams of anhydrous silicate to obtain a 60 percent solids content.

The primary advantage of the use of this anhydrous silicate to increase the viscosity of the silicate-containing composition is that, while anhydrous silicate itself will not expand, admixture with the liquid silicate and the subsequent curing operation cause the anhydrous material to become hydrated and hence subject to subsequent expansion. Thus the purpose of providing a silicate composition which may be ground to a particulate form prior to expansion is served, while increasing, rather than decreasing as in certain prior art techniques, the amount of silicate capable of undergoing expansion.

The first step involves mixing the anhydrous with the liquid silicate, which is best done at temperatures in excess of ambient but less than boiling. Conveniently, the liquid silicate is first heated to a temperature on the order of 160° F. at which time admixing of the anhydrous silicate is commenced. Moisture loss becomes a consideration at temperatures substantially in excess of 160° F., although it may be avoided by the use of closed containers. At the boiling point premature foaming commences and is to be avoided.

The "primary insolubilizers" are those capable of reacting, for the most part, with the alkali portion of the silicate at temperatures less than boiling. Exemplary of these insolubilizers are boric acid; sodium, potassium, calcium, magnesium and zinc silicofluorides; alum; ferrosilicon, and calcium, magnesium and barium chlorides. The amount to be used varies with the identity of the insolubilizer and the weight ratio and quantity of the silicate used. A sufficient amount must be provided to prevent caking of the composition, caused by the hygroscopic nature of the alkali metal silicates, prior to expansion but subsequent to grinding. This amount may be lessened somewhat if the time lapse between grinding and expansion is short and excessive exposure to moisture at this stage is not contemplated. On the other hand, use of excessive quantities of the primary insolubilizer will reduce the silicate's capacity to expand. For example, in the case of $Na_2SiF_6$, with a sodium silicate having a 1:3.22 weight ratio and 60 percent silicate solids, from 5–15 percent by weight is effective.

The secondary insolubilizers useful in the practice of the present invention are those capable of reacting for the most part with the silicate portion of the alkali metal silicate at the temperatures involved in the expansion operation, i.e., 800–1800° F. The secondary insolubilizers are essentially insoluble in and nonreactive with the alkali metal silicate solution at temperatures less and 250° F. Exemplary of the secondary insolubilizers are magnesium phosphate, tribasic; portland cement; calcium silicate; iron and zinc oxides; calcium, barium and magnesium carbonates, and fly ash. The amount used is that amount sufficient to render the expanded aggregate water-insoluble, it having been noted that less than the amount theoretically required for complete reaction with silicate will achieve this effect. For example, using calcium carbonate as the secondary insolubilizer it has been found that an aggregate having, for all practical purposes, complete water insolubility may be produced by the use of only 75 grams of calcium carbonate for every 100 grams of sodium silicate solids (silicate weight ratio 1:3.22), 127 grams of calcium carbonate being the stoichiometric quantity. The expense of the insolubilizer generally being greater than that of the silicate and the presence of large quantities tending to increase the density of the resultant aggregate, it becomes apparent that the use of minimum amounts of these materials is usually desirable.

The total amount of insolubilizers, both primary and secondary, is generally considerably less than the stoichiometric amount required for total reaction with the alkali metal silicate present. For example, using a sodium silicofluoride-calcium carbonate insolubilizer system, it has been found that the use of from 21–84 percent of the stoichiometric amount results in an aggregate having the desired properties. Use of larger quantities acts primarily to increase the cost of the aggregate as well as to increase its density (by reducing the degree of expansion obtainable and by acting as a filler). On the other extreme, too little of these materials results in caking of the ground material and/or a water-soluble aggregate.

These insolubilizers must be added to the silicate prior to the time by which the anhydrous silicate has become substantially hydrated for the simple reason that, owing to the viscosity increase exhibited upon hydration of the anhydrous material, it becomes impossible to obtain adequate dispersion of the insolubilizers. Thus, the insolubilizers must be added to the liquid silicate prior to the addition of the anhydrous material or at some time shortly thereafter.

Mixing is then continued until the viscosity of the mixture has increased, owing primarily to the hydration of the anhydrous silicate, to such a level that the component parts of the mixture will not separate on standing at temperatures up to boiling. As in other systems, viscosity is less at higher temperatures therefore the degree of hydration required to maintain a dispersion at elevated temperatures will be greater.

Once a stable dispersion is achieved, the mixed composition is "cured," preferably at greater than 140° F., for example 180° F. and up to boiling. The purpose of the curing step is to insure complete hydration of the anhydrous silicate as well as to allow reaction of the primary insolubilizer. Typically, the curing operation may be complete within 1–2 hours. However, this figure obviously varies with such factors as temperature, quantities of added anhydrous silicate and primary insolubilizer and the like.

Following the curing operation, the composition is cooled to substantially room temperature to provide a grindable solid. At elevated temperatures the composition often remains sufficiently "fluid" to hinder successful grinding. Grinding is then commenced to provide discrete particles suitable for expansion which, owing to their solid nature and the nonhygroscopic properties imparted by the primary insolubilizer, remain non-adherent. These particles, if properly prepared, may be stored or shipped in this condition while remaining a free-flowing particulate solid. An obvious advantage of this property in both storing and shipping, as compared to expanded particles, is the lesser amount of space required, since expansion can result in a product having 25 times the volume of the non-expanded particles.

The final step in the process is subjection of the particles to elevated temperatures sufficient to cause rapid expansion of the silicate and complete reaction of the secondary insolubilizer. Whereas alkali metal silicates can be caused to expand at relatively low temperatures, e.g., 250° F., such temperatures are not useful in the practice of the present invention since the resultant aggregate is of relatively high density and water solubility. Temperatures within the range of about 800–1800° F. are required. Temperatures on this order cause rapid and complete expansion, resulting in a low density product, and also allow complete reaction of the secondary insolubilizer, thus giving a substantially completely water-insoluble material. It is interesting to note that these temperatures are in excess of those at which many other expanded bodies, such as "straight" expanded sodium silicates, begin to soften and lose their utility as fire resistant materials of construction. The aggregates of the present invention, on the other hand, are capable of withstanding quite high temperatures, for example, up to 2200° F. using calcium carbonate as the secondary insolubilizer.

In order that those skilled in the art may more readily understand the present invention, the following specific examples are afforded.

Example 1

A number of aggregates are prepared according to the present invention, using the quantities and nature of ingredients shown in the following table. In each instance the anhydrous silicate, primary insolubilizer and secondary insolubilizer are dry-blended prior to addition to the aqueous silicate, held at a temperature of 160° F., with mixing. When the mixture no longer separates upon standing, stirring is ceased and the composition is cured at about 180° F. for from 1–2 hours. Following cooling to room temperature, the composition is ground to particulate form and expanded on a hotplate at a temperature at about 1000° F.

TABLE

| Sample | Aqueous sodium silicate [1] grams | Anhydrous sodium silicate [2] grams | Sodium silicate solids/total silicate basis (percent) | Sodium silicate solids/aggregate basis (percent) | Primary insolubilizer (grams) | Secondary insolubilizer (CaCO₃) (grams) | Aggregate density W/cure (lbs./ft.³) | Aggregate density W/o cure (lbs./ft.³) | Softening (° F.) |
|---|---|---|---|---|---|---|---|---|---|
| 1 | 100 | 50 | 59.5 | 62.8 | [3] 3 | 50 | 19 | | |
| 2 | 100 | 40 | 56.6 | 77.5 | [3] 3 | 20 | 7.2 | | 1,050 |
| 3 | 100 | 40 | 55.6 | 70.6 | [3] 3 | 30 | 11.3 | | 1,100 |
| 4 | 100 | 40 | 56.6 | 69.4 | [4] 5 | 30 | 19 | | 1,550 |
| 5 | 100 | 40 | 56.6 | 63.8 | [4] 5 | 40 | 12.5 | 17.5 | 1,700 |
| 6 | 100 | 40 | 56.6 | 59.0 | [4] 5 | 50 | 14.3 | 18.5 | 1,800 |
| 7 | 100 | 40 | 56.6 | 55.0 | [4] 5 | 60 | 15 | 22.5 | 1,950 |
| 8 | 100 | 40 | 56.6 | 55.8 | [4] 3 | 60 | 13 | 20 | |
| 9 | 100 | 40 | 56.6 | 55.2 | [4] 1 | 60 | 9 | | |
| 10 | 100 | 40 | 56.6 | 53.2 | [4] 10 | 60 | 28 | | |
| 11 | 100 | 70 | 64.3 | 67.1 | [4] 3.5 | 50 | 6 | | 1,600 |

[1] Na₂O:SiO₂ weight ratio 1:3.22, 39.3% solids.  [2] Na₂O:SiO₂ weight ratio 1:3.22.  [3] H₃BO₃.
[4] Na₂SiF₆.

The table is essentially self-explanatory. It may be noted that Samples 7–10 show that, as the amount of primary insolubilizer increases, so does the density of the resultant aggregate. On the other hand, Samples 5–7 show that an increase in the amount of secondary insolubilizer has a less predicatble effect upon the density of the aggregate, although the temperature at which said aggregate softens increases with increased secondary insolubilizer content. Further, from Samples 5–8, it is readily recognizable that the curing operation has a dramatic effect upon the density of the resultant aggregate.

Example 2

Following the procedure of Example 1, 100 grams of the liquid sodium silicate, 30 grams of the anhydrous silicate, 15 grams of calcium trisilicate and 7.5 grams of boric acid are used to prepare an aggregate having a density of 3.0 pounds per cubic foot and a softening point of 1100° F.

Example 3

As a contrast, again following the procedure of Example 1, a composition containing 100 grams of the liquid silicate and 70 grams of the anhydrous silicate are mixed, cured and ground. The particulate material, upon exposure to atmospheric moisture, resumes a solid shape. When expanded immediately after grinding, the aggregate, while having a bulk density of 1.5 pounds per cubic foot and a softening point of 1400° F., is readily soluble in hot water.

Example 4

The composition of Sample 8 of Example 1 is expanded (A) at a temperature of just under 800° F. and (B) at a temperature of about 1200° F. The resultant aggregates are then placed in a 100% relative humidity atmosphere. Aggregate A rapidly absorbs moisture, becoming soft and sticky, while aggregate B remains dry and free flowing.

Example 5

Again according to the procedure of Example 1, 100 grams of the liquid silicate, 40 grams of the anhydrous silicate and 5 grams of sodium silicofluoride were mixed, cured, ground and expanded. While having a density of 5 pounds per cubic foot, the aggregate was 91% water soluble.

While the invention has been described by reference to certain specific and preferred embodiments thereof, it is not to be so limited since changes and alterations may be made therein while remaining within the scope of the appended claim.

We claim:

1. Process for preparing an expanded insoluble aggregate based on an alkali metal silicate, which process comprises:
    (A) mixing, at a temperature less than boiling, an aqueous alkali metal silicate having an alkali metal oxide:silicon dioxide weight ratio of from about 1:3.0–7.0 with an essentially anhydrous alkali metal silicate within the same weight ratio range, the amount of anhydrous added being that quantity sufficient to give, in combination with the aqueous, a total alkali metal silicate solids content of from 80–40% by weight and the amount of alkali metal silicate solids being 40–90% by weight, dry basis, of the total resultant aggregate;
    (B) admixing, prior to the time when the anhydrous alkali metal silicate becomes substantially hydrated, two insolubilizing compounds as follow;
        (1) a primary insolubilizer capable of reacting with the alkali portion of the alkali metal silicate at temperatures less than boiling, the amount used being that sufficient to reduce hygroscopicity of the silicate to the point where caking of the composition prior to expansion but subsequent to grinding is prevented and
        (2) a secondary insolubilizer capable of reacting with the silicate portion of the alkali metal silicate at temperatures used in expanding same, the amount used being that sufficient to render the expanded aggregate water-insoluble, the total amount of insolubilizers used being less than the stoichiometric amount required for total reaction with the alkali metal silicate present;
    (C) continuing mixing until the components will not separate on standing at temperatures up to boiling;
    (D) curing the mixed composition at temperatures up to boiling until the anhydrous alkali metal silicate has become substantially hydrated and the primary insolubilizer reacted;
    (E) cooling the composition to a grindable solid;
    (F) grinding the composition into discrete nonadherent particles suitable for expansion and
    (G) rapidly expanding the particles and causing the secondary solubilizer to react by exposure to temperatures of from about 800°–1800° F.

References Cited
UNITED STATES PATENTS

| | | | |
|---|---|---|---|
| 3,095,312 | 6/1963 | Holmes | 106—75 |
| 3,184,371 | 5/1965 | Seidl | 106—75 |
| 3,268,350 | 8/1966 | Grebe et al. | 106—75 |
| 3,466,221 | 9/1969 | Sams et al. | 106—75 |

JAMES E. POER, Primary Examiner

U.S. Cl. X.R.

106—75